US012762184B2

(12) United States Patent
Zhang et al.

(10) Patent No.: US 12,762,184 B2
(45) Date of Patent: Oct. 13, 2026

(54) GRAPH DATA PROCESSING

(71) Applicants: ZHEJIANG LAB, Hangzhou (CN); Huazhong University of Science and Technology, Wuhan (CN)

(72) Inventors: Yu Zhang, Hangzhou (CN); Hao Qi, Hangzhou (CN); Kang Luo, Hangzhou (CN); Jin Zhao, Hangzhou (CN); Zhan Zhang, Hangzhou (CN)

(73) Assignees: Zhejiang Lab, Hangzhou (CN); Huazhong University of Science and Technology, Wuhan (CN)

( * ) Notice: Subject to any disclaimer, the term of this patent is extended or adjusted under 35 U.S.C. 154(b) by 406 days.

(21) Appl. No.: 18/396,493

(22) Filed: Dec. 26, 2023

(65) Prior Publication Data

US 2024/0303277 A1 Sep. 12, 2024

(30) Foreign Application Priority Data

Mar. 10, 2023 (CN) ........................ 202310262288.9

(51) Int. Cl.
*G06F 12/00* (2006.01)
*G06F 9/48* (2006.01)
(Continued)

(52) U.S. Cl.
CPC ........ *G06F 16/9024* (2019.01); *G06F 9/4881* (2013.01); *G06F 9/5066* (2013.01); *G06F 2209/501* (2013.01); *G06F 2209/5017* (2013.01)

(58) Field of Classification Search
CPC ........... G06F 16/9024; G06F 16/90335; G06F 9/4881; G06F 9/5066; G06F 9/5061;
(Continued)

(56) References Cited

U.S. PATENT DOCUMENTS

2012/0317149 A1* 12/2012 Jagota ................. G06F 16/9024
707/E17.011
2016/0125118 A1* 5/2016 Chaudhuri .............. G06F 30/34
716/101

FOREIGN PATENT DOCUMENTS

CN 114616560 A 6/2022
CN 115408427 A 11/2022
CN 115544555 A 12/2022

OTHER PUBLICATIONS

Mao et al., "Research on the application of graph processing in ATPG," Science China Press, 2023, 53(2):211-233, 23 pages (with English abstract).

* cited by examiner

*Primary Examiner* — Shawn X Gu
(74) *Attorney, Agent, or Firm* — Fish & Richardson P.C.

(57) ABSTRACT

Systems, methods, devices and storage media for graph data processing are provided. In one aspect, a graph data processing system includes a memory and a plurality of processing units, and each processing unit is provided with a decision module. Each processing unit is configured to determine set operations required for extracting one or more subgraphs matching a specified graph pattern from target graph data according to a preset graph pattern matching algorithm. Then, for each set operation, the decision module is configured to determine a cost value corresponding to a performance of the processing unit occupied to execute the set operation in accordance with different execution policies, and further select a target execution policy with a smallest cost value to execute the set operation.

20 Claims, 4 Drawing Sheets

(51) Int. Cl.
*G06F 9/50* (2006.01)
*G06F 16/901* (2019.01)

(58) Field of Classification Search
CPC ............. G06F 9/5044; G06F 2209/501; G06F 2209/5017; Y02D 10/00
See application file for complete search history.

GRAPH DATA PROCESSING

CROSS REFERENCE TO RELATED APPLICATIONS

The present application claims priority to Chinese Patent Application No. 202310262288.9 filed on Mar. 10, 2023, and the entire content of the Chinese patent application is incorporated herein by reference.

TECHNICAL FIELD

The present disclosure relates to graph computing technology, and in particular, to a system and a method for graph data processing, a device and a storage medium.

BACKGROUND

With the development of big data technology, the scale of graph data is growing, and the types of graph data are also increasing. This makes the relationship between entity objects corresponding to nodes in the graph data become more complex. How to analyze and mine the complex relationship contained in the graph data has become a current research hotspot.

In the existing technology, a graph pattern matching algorithm is usually adopted to extract subgraphs that match a specified graph pattern from graph data, and tasks are executed based on the extracted subgraphs. The graph pattern is used to represent the association rules between specific entities in actual scenarios. For example, in the field of medicine, there is a specific molecular structure that may be used for medical treatment, and the connection relationship between the molecules contained in this molecular structure may be designed as a graph pattern, and the subgraphs matching the graph pattern may be queried from the corresponding graph data of other macromolecular substances so as to determine whether the other macromolecular substances contain this molecular structure. However, the current execution efficiency of graph pattern matching algorithm is low, which cannot meet the processing requirements of large-scale graph data.

SUMMARY

The present disclosure provides a system, method, device, and storage medium for graph data processing to partially solve the above problems existing in the existing technology.

A graph data processing system is provided by the first aspect of embodiments of the present disclosure, the graph data processing system includes a memory and a plurality of processing units, and each processing unit is provided with a decision module, where each of the processing units is configured to: for obtained target graph data, according to a preset graph pattern matching algorithm, determine a plurality of set operations required to extract one or more subgraphs matching a specified graph pattern from the target graph data, where each of the set operations is configured to represent an operation executed on neighboring node sets of two nodes in the target graph data, the operation includes at least one of taking an intersection set of two of the neighboring node sets or taking a difference set of two of the neighboring node sets; a decision module in each of the processing units is configured to: for each of the set operations, according to a number of nodes contained in two node sets involved in the set operation and a preset cost function, determine cost values for executing the set operation respectively in accordance with a plurality of execution policies, and select an execution policy with the smallest cost value as a target policy corresponding to the set operation; In addition, each of the processing units is further configured to: for each of the set operations, execute the set operation according to the corresponding target policy, obtain an execution result corresponding to the set operation, and store the execution result in the memory; and in response to obtaining the respective execution results corresponding to each set operation, read the respective execution results corresponding to the plurality of set operations from the memory, and according to the respective execution results corresponding to the plurality of set operations determine one or more subgraphs matching the specified graph pattern in the target graph data to execute one or more tasks according to the one or more subgraphs. In particular, the memory is on-chip caches suitable for being packaged together with the processing unit, which is used for storing the respective execution results corresponding to each set operation.

Optionally, a detection module is provided in each of the processing units. The detection module is configured to: for each set operation, determine whether a number of times the set operation is executed exceeds a preset threshold, in response to determining that the number of times the set operation is executed exceeds the preset threshold, determine that the set operation is a target set operation, and persistently store an execution result of the target set operation for reuse when the set operation needs to be executed again.

Optionally, the graph data processing system further includes at least one dynamic partition module, and each of the at least one dynamic partition module is configured to: obtain original graph data; for each node in the original graph data, determine whether a degree of the node exceeds a preset threshold, in response to determining that the degree of the node exceeds the preset threshold, determine that the node is a center node, and through multiple rounds of neighboring node traversal, determine each node that has a connection relationship with the center node as an associated node of the center node; determine a graph data block according to the center node and the associated nodes of the center node, and take the graph data block as target graph data, so that the processing unit processes the graph data block.

Optionally, the dynamic partition module is further configured to: for each of the graph data blocks, generate a processing task used to process the graph data block, and add the processing task to a preset task queue. Thus, the processing unit may obtain the processing task from the task queue, and take the graph data block corresponding to the processing task as the target graph data.

Optionally, the dynamic partition module is further configured to: for each center node, determine whether the center node is an accessed node, in response to determining that the center node is not the accessed node, through multiple rounds of neighboring node traversal, determine the associated nodes of the center node, and set the center node as an accessed node.

Optionally, the detection module is further configured to: for each set operation, determine whether there is a unique identifier corresponding to the set operation, in response to determining that there is not a unique identifier corresponding to the set operation, generate and store the unique identifier corresponding to the set operation according to two sets involved in the set operation and a type of the set operation.

Optionally, the decision module is further configured to: for each set operation, according to the number of nodes contained in the two node sets involved in the set operation and performance data of the processing unit that executes the set operation, determine computing time and memory access time required to execute the set operation in accordance with each of the execution policies, and determine a cost value corresponding to each of the execution policies according to the computing time and the memory access time. The performance data of the processing unit includes a bandwidth of the processing unit and a memory access delay of the processing unit.

A graph data processing method applied to a graph data processing system is provided by the second aspect of embodiments of the present disclosure, including: for obtained target graph data, according to a preset graph pattern matching algorithm, by one of the plurality of processing units, determining a plurality of set operations required to extract one or more subgraphs matching a specified graph pattern from the target graph data, where each of the set operations is configured to represent an operation executed on neighboring node sets of two nodes in the target graph data, the operation includes at least one of taking an intersection set of two of the neighboring node sets or taking a difference set of two of the neighboring node sets; and for each of the set operations, according to a number of nodes contained in two node sets involved in the set operation and a preset cost function, by the decision module in the processing unit, determining cost values for executing the set operation respectively in accordance with a plurality of execution policies, and selecting an execution policy with the smallest cost value from the plurality of execution policies as a target policy corresponding to the set operation; for each of the set operations, according to the corresponding target policy, by the processing unit, executing the set operation to obtain an execution result corresponding to the set operation, and store the execution result in the memory; and in response to obtaining the respective execution results corresponding to each set operation, by the processing unit, reading the respective corresponding execution results of the plurality of set operations from the memory, and according to the respective corresponding execution results of the plurality of set operations, determining one or more subgraphs matching the specified graph pattern in the target graph data to execute one or more tasks according to the one or more subgraphs.

Optionally, a detection module is provided in the processing unit, the method further includes: for each set operation, by the detection module perform, determining whether a number of times the set operation is executed exceeds a preset threshold, in response to determining that the number of times the set operation is executed exceeds the preset threshold, determining that the set operation is a target set operation, and persistently storing an execution result of the target set operation for reuse when the set operation needs to be executed again.

Optionally, the graph data processing system further includes a dynamic partition module, the method further includes: by the dynamic partition module, obtaining original graph data; for each node in the original graph data, by the dynamic partition module, determining whether a degree of the node exceeds a preset threshold, in response to determining that the degree of the node exceeds the preset threshold, determining that the node is a center node, through multiple rounds of neighboring node traversal determining each node that has a connection relationship with the center node as an associated node of the center node; and determining a graph data block according to the center node and the associated nodes of the center node, so that the processing unit takes the graph data block as the target graph data.

Optionally, taking the graph data block as the target graph data includes: by the processing unit, obtaining a processing task from a preset task queue, and taking the graph data block corresponding to the processing task as the target graph data. The processing task is generated by the dynamic partition module for each of the graph data blocks and added to the preset task queue.

Optionally, through multiple rounds of neighboring node traversal, determining each node that has the connection relationship with the center node includes: determining whether the center node is an accessed node; in response to determining that the center node is not the accessed node, through the multiple rounds of neighboring node traversal, determining the associated nodes of the center node, and setting the center node as an accessed node.

Optionally, before determining whether a number of times the set operation is executed exceeds the preset threshold, the method further includes: determining whether there is a unique identifier corresponding to the set operation, in response to determining that there is not a unique identifier corresponding to the set operation, generating and storing the unique identifier corresponding to the set operation according to two sets involved in the set operation and a type of the set operation.

Optionally, according to the number of the nodes contained in the two sets involved in the set operation and the preset cost function determining the cost values for executing the set operation respectively in accordance with the plurality of execution policies includes: according to the number of the nodes contained in the two node sets involved in the set operation and performance data of the processing unit that executes the set operation, determining computing time and memory access time required to execute the set operation in accordance with each execution policy; and determining a cost value corresponding to each execution policy according to the computing time and the memory access time. The performance data of the processing unit includes a bandwidth of the processing unit and a memory access delay of the processing unit.

A computer-readable storage medium is provided by the third aspect of embodiments of the present disclosure, the storage medium stores a computer program, when the computer program is executed by a processor, the above-mentioned graph data processing method is implemented.

An electronic device is provided by the fourth aspect of embodiments of the present disclosure, including a memory, a processor, and a computer program stored on the memory and executable on the processor, when the processor executes the program, the above-mentioned graph data processing method is implemented.

As can be seen from the above, according to the preset graph pattern matching algorithm, by determining the set operations required for extracting subgraphs matching the specified graph pattern from the target graph data; then, for each set operation, according to the number of elements in the two sets involved in the execution of the set operation, determining a cost value corresponding to the performance of the processing unit occupied to execute the set operation in accordance with different execution policies, the execution policy with the smallest cost value may be selected to execute the set operation, and the graph data processing efficiency may further be effectively improved.

BRIEF DESCRIPTION OF THE DRAWINGS

The drawings described here are used to provide a further understanding of the present specification and constitute a part of the present disclosure. The schematic embodiments of the present disclosure and their descriptions are used to interpret the present disclosure, and do not constitute an improper limitation on the present disclosure.

DETAILED DESCRIPTION OF EMBODIMENTS

In order to make the purpose, the technical solution, and the advantages of the present disclosure clearer, the technical solution of the present disclosure will be described clearly and comprehensively with reference to specific embodiments of the present disclosure and corresponding drawings. Obviously, the described embodiments are only a part, but not all, of the embodiments of the present disclosure. Based on the embodiments of the present disclosure, all other embodiments obtained by a person of ordinary skill in the art without creative efforts shall fall within the scope of protection of the present disclosure.

The technical solutions provided by the embodiments of the present disclosure will be described in detail below with reference to the drawings.

Figure 1:
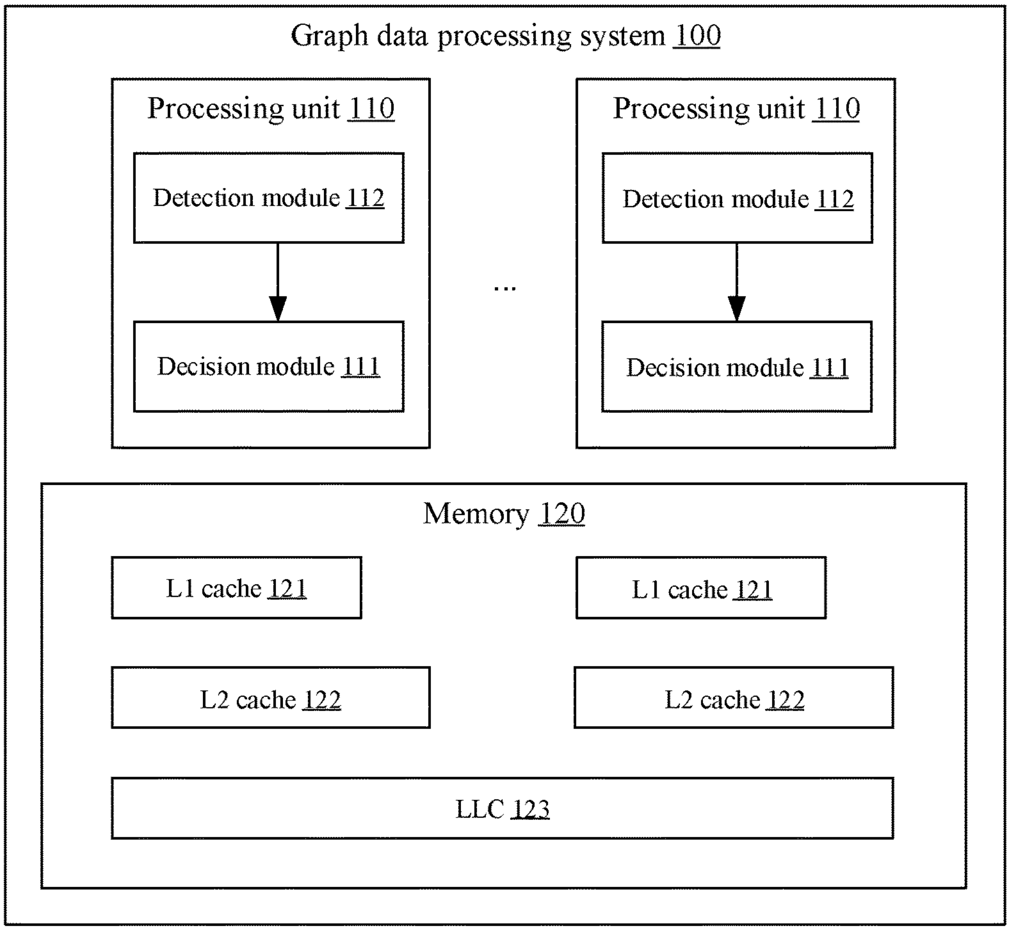
FIG. 1 is an architecture diagram of a graph data processing system according to an embodiment of the present disclosure.

The embodiments of the present disclosure provide a graph data processing system, as shown in FIG. 1, the graph data processing system 100 includes a plurality of processing units 110 and a memory 120. Each processing unit is provided with a decision module 111 and may be provided with a detection module 112. As shown in FIG. 1, the memory 120 may include a plurality of caches, for example, a plurality of Level 1 (L1) caches 121, a plurality of Level 2 (L2) caches 122, and at least one Last Level Cache (LLC) 123, and these caches are all components of a typical CPU architecture. For example, in FIG. 1, the L1 cache 121, the L2 cache 122, and the LLC 123 may all be on-chip storage units on a processor, and the data to be stored may first be loaded into the LLC 123, and then transmitted to the processing unit 110 sequentially through the L2 cache 122 and the L1 cache 121.

The processing unit 110 is configured to: for obtained target graph data, according to a preset graph pattern matching algorithm, determine at least one set operation required to extract one or more subgraphs matching a specified graph pattern from the target graph data. The set operation here refers to an operation executed on neighboring node sets of two nodes in the target graph data, including operations such as taking the intersection set of two neighboring node sets, and taking the difference set of two neighboring node sets.

Concretely, the decision module 111 in the processing unit 110 may be used to: according to the number of nodes contained in the two node sets and a preset cost function, determine a cost value for executing the set operation in accordance with each execution policy in a plurality of execution policies, and select a target policy according to the cost values (e.g., the execution policy with the smallest cost value in the plurality of execution policies). After determining the target policy, the processing unit 110 may be used to: obtain the corresponding execution result by executing the set operation on the target graph data according to the target policy, and store the execution result in the memory; then, in response to obtaining the respective execution result corresponding to each set operation, read the respective execution result corresponding to each set operation from the memory, and according to the execution result corresponding to each set operation, determine the subgraph matching the specified graph pattern in the target graph data, so as to execute tasks according to the subgraph. The cost function is mainly used to: according to time complexity and hardware features, estimate the execution time for executing the set operation in accordance with each execution policy, so as to be able to select the execution policy with the smallest execution time as the target policy.

The above-mentioned execution policies may be set according to actual needs, such as: execution policies based on merging algorithms, execution policies based on binary search algorithms, execution policies based on hash algorithms, execution policies based on bit array algorithms.

In different application scenarios, the tasks that need to be executed according to the subgraph may also be different. For example, in electronic commerce scenarios, the graph pattern corresponding to the association relationship between the users having similar needs may be determined according to what users have in common, and a user subgraph matching the above graph pattern may further be determined from the user graph data, and product recommendations may be made for corresponding users based on the user subgraph.

The graph pattern matching algorithms required to extract different graph patterns from the target graph data are usually different. For example, the processing unit may determine the set operations required to extract subgraphs from the target graph data that match the specified graph pattern according to a preset graph pattern matching algorithm, specifically as shown in FIG. 2A and FIG. 2B.

Figure 2A:
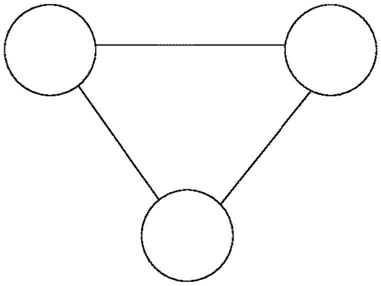
FIG. 2A and FIG. 2B are diagrams of a graph pattern matching algorithm according to an embodiment of the present disclosure.
Figure 2B:
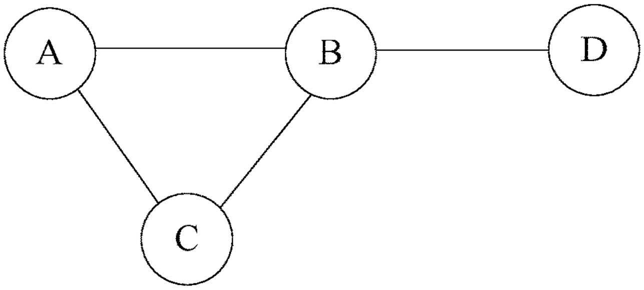

FIG. 2A and FIG. 2B are diagrams of a graph pattern matching algorithm according to embodiments of the present disclosure.

It can be seen from FIG. 2A that if the graph pattern that needs to be matched is a triangular structure composed of three nodes connected to each other by an edge, the corresponding graph pattern matching algorithm may include: for each node in the target graph data, determining whether there is an intersection set between the neighboring node set of the node and the neighboring node set of a neighboring node of the node; if there is an intersection set, it means that there is the above-mentioned triangular structure graph pattern; if there is not any intersection set, it means that there is not any the above-mentioned triangular structure graph pattern.

For example, as shown in FIG. 2B, assume that in the target graph data, the neighboring node set of node A includes node B and node C, and the neighboring node set of node B includes node C, node A, and node D. Since the neighboring node set of node A and the neighboring node set of node B both include node C, then node C is the common neighboring node of node A and node B. In other words, any two of node A, node B, and node C may be connected by an edge, which satisfies the above-mentioned triangular structure graph pattern as shown in FIG. 2A. In this case, node A, node B, and node C may be regarded as a subgraph matched through the graph pattern matching algorithm.

As can be seen from the above, a large number of redundant set operations may exist during the execution of graph pattern matching algorithms. For example, for the target graph data as shown in FIG. 2B, the intersection set between the neighboring node set of node A and the neighboring node set of node B, which is a neighboring node of node A, is first taken, so as to obtain the subgraph corresponding to node A, node B, and node C. In addition, the graph pattern matching algorithm needs to start from each node to determine the intersection set between the neighboring node set of the node and the neighboring node set of a neighboring node of the node. Therefore, besides starting from node A to determine the intersection set between the neighboring node sets of node A and its neighboring nodes (including node B), it also starts from node B to determine the intersection set between the neighboring node sets of node B and its neighboring nodes (including node A), so as to obtain the subgraph corresponding to node A, node B, and node C. Obviously, there is a certain degree of repetition between operations starting from node A and operations starting from node B, thereby reducing the execution efficiency of the graph pattern matching algorithm.

Based on this, as shown in FIG. 1, a detection module 112 may further be provided in the above-mentioned processing unit 110, configured to: for each set operation, determine whether a number of times the set operation is executed exceeds a preset threshold; if the number of times the set operation is executed exceeds a preset threshold, determine that the set operation is a target set operation, and persistently store the execution result of the target set operation for reuse when the set operation needs to be executed again. For example, the execution result of the target set operation may be stored in a specified memory space to avoid overwriting the execution result of the target set operation during the execution of the graph pattern matching algorithm. The specified memory space may be the L1 cache 121 shown in FIG. 1, which is closer to the processing unit 110, so that the processing unit 110 may read the execution result of the target set operation stored therein. Those skilled in the art should understand that cache is a component on the processor, which is located between the processor's computing core and the memory, and is often used to store data commonly used in memory. In particular, the detection module 112 may be implemented as a counter to detect the number of occurrences of the same set operation, and store the execution result of the set operation when the counter reaches a preset threshold to avoid subsequent redundant calculations.

Certainly, before determining whether a number of times the set operation is executed exceeds a preset threshold, the detection module 112 may further perform: determining whether there is a unique identifier corresponding to the set operation: if there is not the unique identifier, generating and storing the unique identifier corresponding to the set operation according to the two sets involved in the set operation and the type of the set operation; if there is the unique identifier, according to the unique identifier corresponding to the set operation, determining the number of times the set operation is executed, and determining whether the number of times the set operation is executed exceeds the preset threshold.

For each node, the unique identifier corresponding to the node may be used to identify the neighboring node set of the node.

For intermediate data (i.e., a node set obtained by taking the intersection set or difference set of two node sets), since the probability of executing a set operation on the intermediate data and other node sets is low, and the number of nodes included in the intermediate data is usually less, the detection module 112 may detect the set operation corresponding to the intermediate data.

In some embodiments, the detection module 112 may determine, for each set operation, whether the set operation is a target set operation. If the set operation is a target set operation, the storage address in the memory 120 for the pre-stored execution result of the target set operation may be returned; if the set operation is not a target set operation, the set operation may be transmitted to the decision module 111 for execution.

In practical application scenarios, the scale of the original graph data obtained by the graph data processing system is often large, so that when the original graph data is directly used as the target graph data for graph pattern matching, a set operation may be executed by multiple processing units, and the statistical value of the number of times the set operation is executed needs to be synchronized between different processing units, resulting in a large amount of additional performance overhead.

Figure 3A:
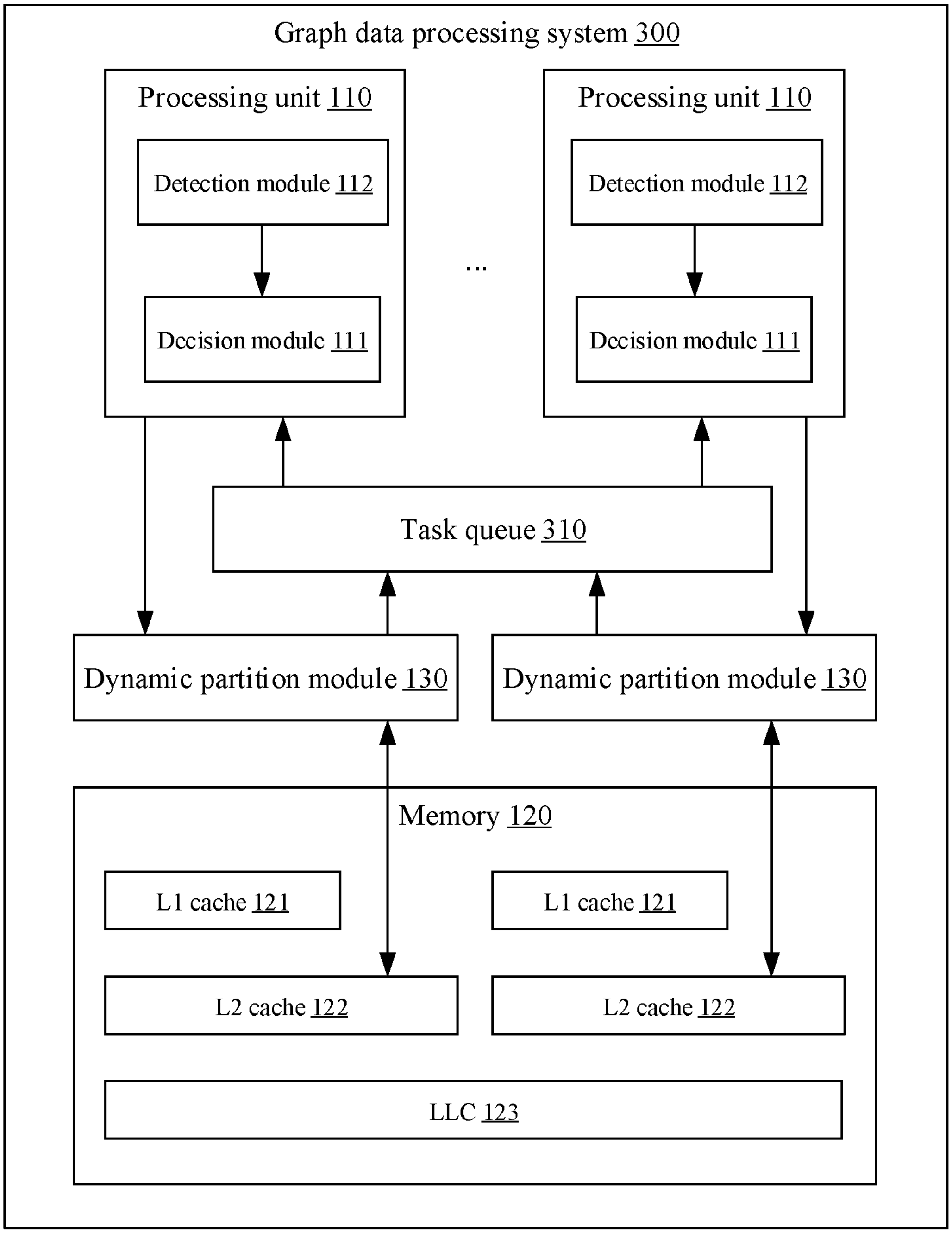
FIG. 3A is another architecture diagram of a graph data processing system according to an embodiment of the present disclosure.

Based on this, the graph data processing system 300 may further include a dynamic partition module 130 as shown in FIG. 3A, which is mainly configured to obtain multiple pieces of target graph data to be processed by multiple processing units respectively from the original graph data. Concretely, the dynamic partition module 130 may be configured to: obtain original graph data; for each node in the original graph data, if the degree of the node exceeds a preset threshold, determine that the node is a center node; for each center node, for example, through multiple rounds of neighboring node traversal, determine a node that has a connection relationship with the center node as an associated node of the center node; according to each center node and the associated nodes of each center node, respectively determine multiple graph data blocks as the target graph data. For an undirected graph (i.e., the edge connecting two nodes in the graph has no direction), the degree of a node refers to the number of neighbors of the node. For example, if node A is connected with 10 nodes, the degree of node A is 10.

Figure 3B:
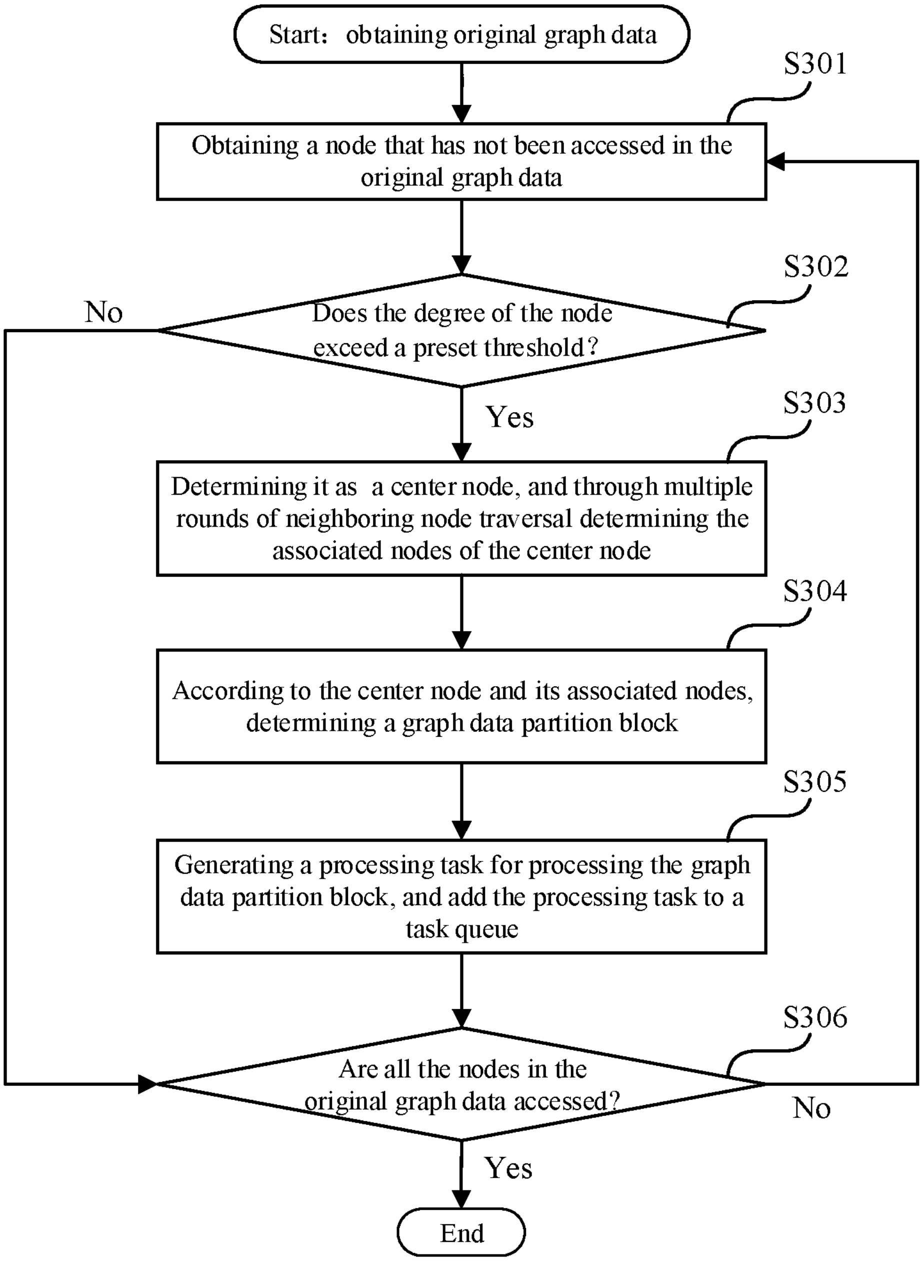
FIG. 3B is a flow diagram of a process of partitioning the original graph data through the dynamic partition module in the graph data processing system shown in FIG. 3A.

FIG. 3B is a flow diagram of a process of partitioning the original graph data through the dynamic partition module in the graph data processing system shown in FIG. 3A provided according to the embodiments of the present disclosure.

As can be seen from FIG. 3B, the dynamic partition module 130 may be configured to: in response to obtaining original graph data, for each node that has not been accessed in the original graph data (S301, S306), determine whether the node is a center node (S302); if the node is a center node, through multiple rounds of neighboring node traversal, determine the node that has a connection relationship with the center node as the associated node of the center node (S303), and set the center node as an accessed node; next, according to the center node and its associated node(s), determine a graph data block (S304).

The above-mentioned neighboring node traversal method may be, such as, depth-first traversal or breadth-first traversal. For each center node, if the depth of accessing the neighboring nodes of the center node reaches the preset threshold, or the neighboring nodes of the center node have all been accessed, the above-mentioned multiple rounds of neighboring node traversal ends to obtain the graph data block.

The dynamic partition module 130 may be configured to: for each graph data block, generate a processing task used to process the graph data block, and add the processing task to a preset task queue 310 (see S305 in FIG. 3A and FIG. 3B), so that the processing unit 110 can obtain the processing task from the task queue 310, and take the graph data block corresponding to the processing task as the target graph data.

It should be noted that, the dynamic partition module 130 may divide the original graph data into multiple graph data blocks, so that the processing task corresponding to each graph data block may be assigned to one processing unit 110 for execution, therefore, a set operation is often concentrated in one processing unit, which may further avoid the performance loss of the processing unit caused by data synchronization between multiple different processing units.

In addition, the above-mentioned graph data processing system may allocate independent storage space for each processing unit, which is used to store data such as the execution result of the set operation and the number of times the set operation is executed. For example, as shown in FIG. 1 and FIG. 3A, a processing unit 110 corresponds to a L1 cache 121 and a L2 cache 122.

By arranging a task queue 310 between the dynamic partition module 130 and the plurality of processing units 110, a plurality of processing tasks generated by dividing the original graph data through the dynamic partition module 130 may be executed by the plurality of processing units 110 in parallel, and thus the processing efficiency of the graph data can be effectively improved. It should be noted that although FIG. 3A shows that the plurality of processing units 110 are respectively configured with dynamic partition modules 130 and share one task queue 310, however, those skilled in the art should be able to understand that the number of dynamic partition modules 130 and the number of task queues 310 are not limited to those shown in FIG. 3A. In fact, as long as partitioning of the original graph data can be implemented and the multiple processing tasks generated by the partitioning of the original graph data are shared between the plurality of processing units, only one dynamic partition module 130 may be configured in the graph data processing system 300, or two or more dynamic partition modules 130 may be configured; similarly, only one task queue 310 may be configured in the graph data processing system 300, or two or more task queues 310 may be configured. For example, the plurality of processing units 110 may be divided into N groups, and one dynamic partition module 130 and one task queue 310 are configured for each group of processing units 110. In particular, the size of each group of processing units (i.e., how many processing units it includes) may be flexibly configured according to the performance data of a single processing unit and the scale of the original graph data to be processed, so as to try to balance the resource allocation and processing efficiency of the entire graph data processing system when executing graph pattern matching tasks.

The decision module 111 in the processing unit 110 may: when determining the target execution policy corresponding to each set operation, according to the number of nodes contained in the two node sets involved in the set operation and performance data of the processing unit that executes the set operation, determine computing time and memory access time required to execute the set operation in accordance with each execution policy, and determine a cost value corresponding to each execution policy according to the computing time and the memory access time. The performance data of the processing unit here includes the bandwidth of the processing unit and the memory access delay of the processing unit.

In addition, for an execution policy with a large computation/memory-access ratio (such as an execution policy based on merge algorithms), a dedicated logic circuit module may be set in the processing unit for calculation. For an execution policy with a small computation/memory-access ratio (such as an execution policy based on bit array algorithms), near-memory architectures may be used to execute the corresponding set operation. The main difference between near-memory architecture and memory includes that by adding computing units next to memory particles and packaging the computing units and memory particles together to form a memory, the operation of setting bits can be implemented in the memory. Thus, since the set operation is completed inside the memory, the memory access time required for data transmission between the memory and the processing unit is reduced, thereby improving the efficiency of graph data processing.

As can be seen from the above, according to a preset graph pattern matching algorithm, the set operations required for extracting subgraphs matching the specified graph pattern from the target graph data may be determined. Then, for each set operation, according to the number of elements in the two sets involved in the execution of the set operation, cost values corresponding to the performances of the processing units occupied to execute the set operation in accordance with different execution policies may be determined, and the execution policy with the smallest cost value may be selected to execute the set operation, and the graph data processing efficiency may be effectively improved.

In the present disclosure, as shown in FIG. 1 and FIG. 3A, the above-mentioned processing unit 110 may refer to a processing core in a multi-core processor. The above-mentioned detection module 112 and decision module 111 may be respective hardware units (e.g., a detector and a decider) arranged on a single processing core in a multi-core processor. The above-mentioned L1 cache 121 and L2 cache 122 may be on-chip caches suitable for packaging with a single processing core. Thus, since each processing unit 110 is configured in close proximity correspondingly with a decision module 111, a detection module 112, on-chip caches 121 and 122, the performance of a single processing unit can be effectively improved.

Furthermore, in the graph data processing system 300 shown in FIG. 3A, the above-mentioned dynamic partition module 130 may be a hardware unit (e.g., a dynamic partitioner) arranged on a multi-core processor, and the above-mentioned task queue 310 may be a First Input First Output (FIFO) memory arranged in the multi-core processor between at least two processing cores and the dynamic partition modules 130. Thus, the processing tasks generated by dividing the original graph data through the dynamic partition module 130 may be executed in parallel by at least two processing units 110 via the task queue 310, which can effectively improve the processing efficiency of the entire graph data processing system 300.

Figure 4:
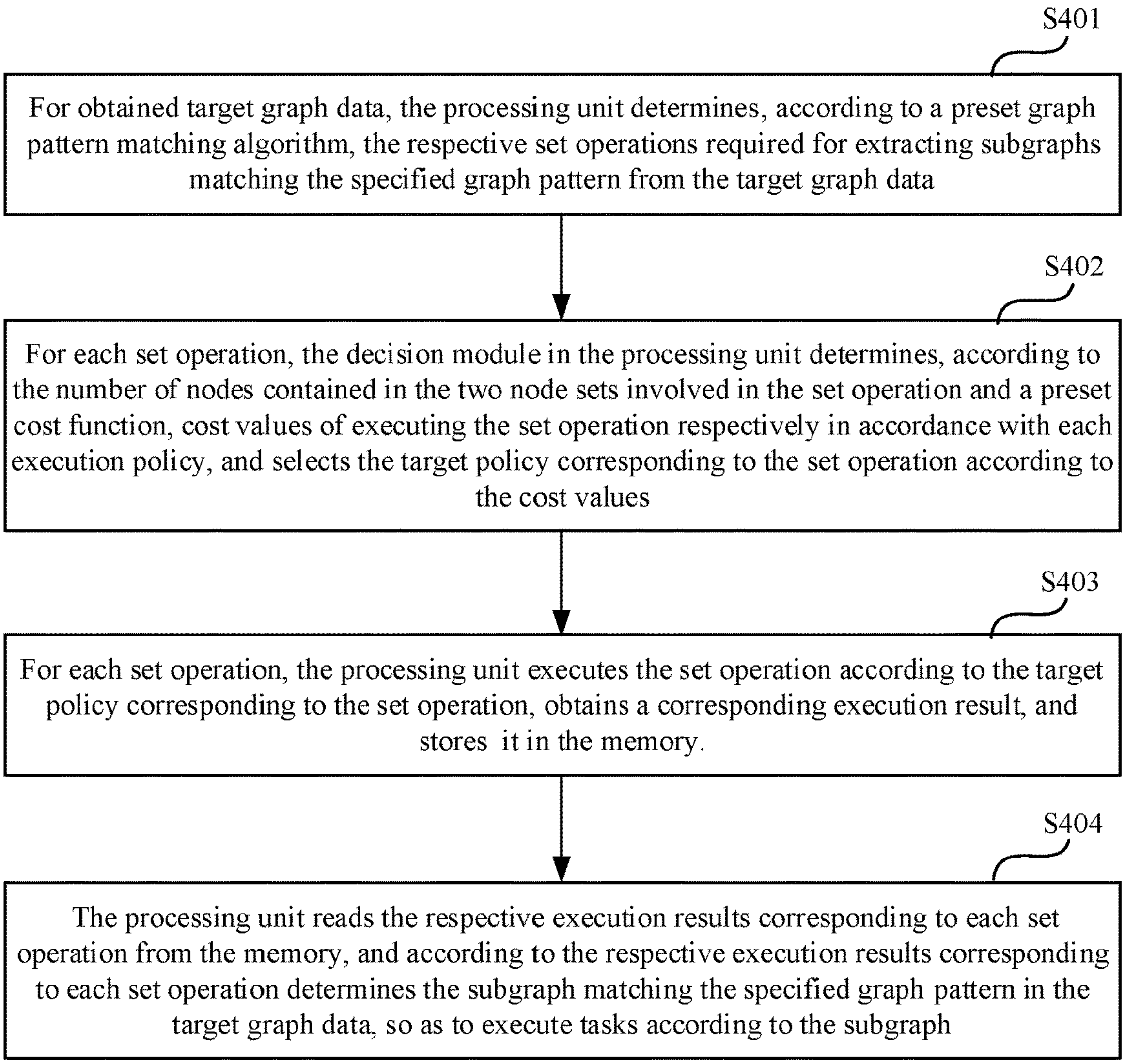
FIG. 4 is a flow diagram of a graph data processing method according to an embodiment of the present disclosure.

In order to further describe the above-mentioned graph data processing system in detail, the present disclosure also provides a method for graph data processing through the above-mentioned graph data processing system, which may be specifically shown in FIG. 4.

FIG. 4 is a flow diagram of a graph data processing method according to the embodiments of the present disclosure, including the following steps S401 to S404.

In step S401: the processing unit determines, according to a preset graph pattern matching algorithm, all the set operations required for extracting subgraphs matching the specified graph pattern from the target graph data, where each set operation is used to represent an operation executed on neighboring node sets of two nodes in the target graph data, and the operation includes at least one of taking an intersection set of two of the neighboring node sets or taking a difference set of two of the neighboring node sets.

In step S402: for each set operation, the processing unit (which may be specifically the decision module therein) determines, according to the number of nodes contained in the two node sets involved in the set operation and a preset cost function, cost values for executing the set operation respectively in accordance with each execution policy in a plurality of execution policies, and selects the target policy corresponding to the set operation according to the cost values.

In step S403: for each set operation, the processing unit executes the set operation according to the target policy corresponding to the set operation, obtains a corresponding execution result, and stores the execution result in the memory.

In step S404: in response to obtaining the respective execution results corresponding to each set operation, the processing unit reads the respective execution results corresponding to each set operation from the memory, and according to the respective execution results corresponding to each set operation determines the subgraph matching the specified graph pattern in the target graph data, so as to execute tasks according to the subgraph.

For each set operation, whether the number of times the set operation is executed exceeds a preset threshold may be determined by the decision module in the processing unit, if the number of times the set operation is executed exceeds a preset threshold, the set operation is determined as the target set operation, and the execution result of the target set operation is persistently stored for reuse when the set operation needs to be executed again.

According to the embodiments of the present disclosure, the target graph data is obtained by partitioning the original graph data. Concretely, partitioning the original graph data may be implemented via the dynamic partition module 130 in the graph data processing system 300 by performing the following: obtaining the original graph data; for each node in the original graph data (S301, S306), if the degree of the node exceeds a preset threshold, determining the node to be the center node (S302, S303); for each center node, through multiple rounds of neighboring node traversal, determining the node that has a connection relationship with the center node as the associated node of the center node (S303); for each center node, determining a graph data block (S304) according to the center node and the associated nodes of the center node, generating a processing task for processing the graph data block, and adding it to a task queue (S305). For example, the processing unit may obtain a processing task from a preset task queue, and regard the graph data block corresponding to the processing task as the target graph data. The processing tasks are generated by the dynamic partition module 130 for each graph data block, and added to the preset task queue.

For each center node, the dynamic partition module may: determine whether the center node is an accessed node; if the center node is not an accessed node, through the multiple rounds of neighboring node traversal, determine the nodes that has a connection relationship with the center node as the associated nodes of the center node, and sets the center node as an accessed node.

For each set operation, the detection module may: determine whether there is a unique identifier corresponding to the set operation; if there is not the unique identifier, generate and store the unique identifier corresponding to the set operation according to the two sets involved in the set operation and the type of the set operation.

For each set operation, the decision module may: according to the number of nodes contained in the two node sets involved in the set operation and performance data of the processing unit that executes the set operation, determine computing time and memory access time required to execute the set operation in accordance with each of the execution policies, and determine a cost value corresponding to each of the execution policies according to the computing time and the memory access time. The performance data of the processing unit here includes the bandwidth of the processing unit and the memory access delay of the processing unit.

As can be seen from the above, according to the preset graph pattern matching algorithm, the set operations required for extracting subgraphs matching the specified graph pattern from the target graph data may be determined; then, for each set operation, according to the number of elements in the two sets involved in the execution of the set operation, a cost value corresponding to the performance of the processing unit occupied to execute the set operation in accordance with different execution policies may be determined, and the execution policy with the smallest cost value may be selected to execute the set operation, thus the graph data processing efficiency can further be effectively improved.

The present disclosure also provides a computer-readable storage medium that stores computer programs, the computer programs may be used to execute the above-mentioned graph data processing method.

Figure 5:
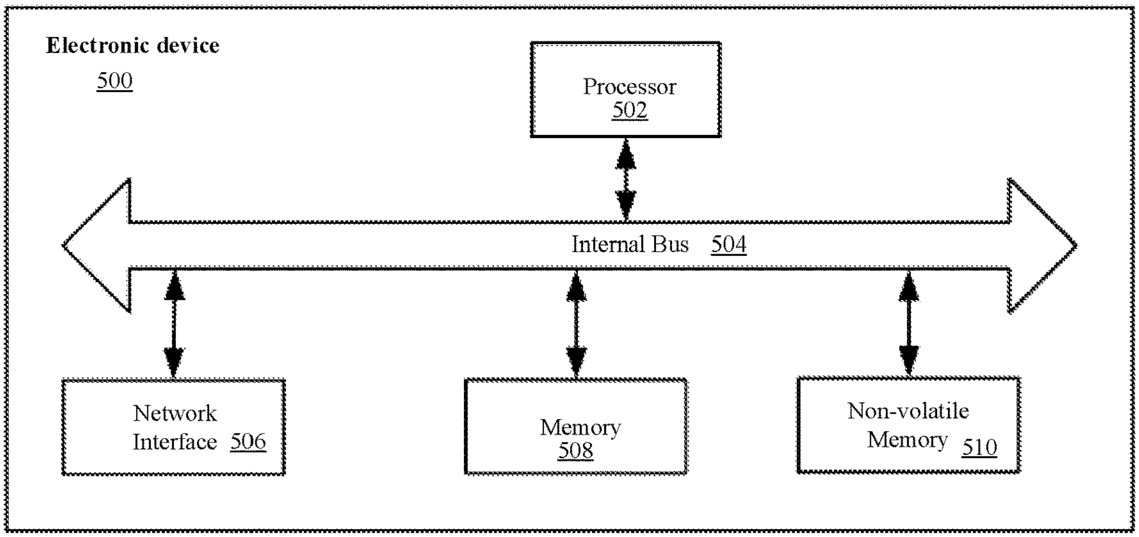
FIG. 5 is a structure diagram of an electronic device for graph data processing according to an embodiment of the present disclosure.

According to an embodiment of the present disclosure a structure diagram of an electronic device 500 for graph data processing is also provided. As shown in FIG. 5, at the hardware level, the electronic device 500 includes a processor 502, an internal bus 504, a network interface 506, a memory 508, and a non-volatile memory 510. The processor 510 in FIG. 5 may be a multi-core processor, and each of multiple processing cores in the multi-core processor may respectively serve as a processing unit in the graph data processing system shown in FIG. 1 and FIG. 3A. In addition, the memory 508 in FIG. 5 may correspond to the memory in the graph data processing system shown in FIG. 1 and FIG. 3A, and the memory 508 can be an on-chip cache packaged together with the processing core. Of course, the electronic device 500 may also include other hardware required for other businesses. The processor 502 reads the corresponding computer program from non-volatile memory 510 into the memory 508 and runs it to achieve the above-mentioned graph data processing method.

Of course, apart from software implementation methods, the present disclosure does not exclude other implementation methods, such as logical devices or combinations of software and hardware, etc. This means that the execution subject of the following processing flow is not limited to each logical unit, but also may be hardware or logical devices.

In the 1990$s$, for a technological improvement, there was a clear distinction between an improvement in hardware (for example, for the circuit structure of diodes, transistors, switches, etc.) and an improvement in software (for methods and processes). However, with the development of technology, the improvement of many methods and processes may be regarded as a direct improvement of the structure of a hardware circuit. Designers almost always obtain the corresponding hardware circuit structure by programming the improved method or process into a hardware circuit. Therefore, it is possible that an improvement of a method or a process is realized by entity modules of hardware. For example, a Programmable Logic Device (PLD), for example, a Field Programmable Gate Array (FPGA), is such an integrated circuit whose logic function is determined by the user programming the device. A digital system is "integrated" on a PLD through the programming of the designers, rather than a dedicated integrated circuit chip designed and produced by a chip manufacturer. Moreover, nowadays, instead of making integrated circuit chips manually, this programming is mostly implemented using "logic compiler" software, which is similar to the software compiler used in program development, and the original code before compilation must be written in a specific programming language, which is called a Hardware Description Language (HDL). There are multiple HDLs rather than one, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc., and the most commonly used currently are VHDL (Very-High-Speed Integrated Circuit Hardware Description Language) and Verilog. A person of ordinary skill in the art should also understand that by logically programming the method or process using the above-mentioned several hardware description languages and integrated it into an integrated circuit, a hardware circuit that implements such logic method or process can be easily obtained.

The controller may be implemented in any suitable manner. For example, the controller may take the form of a microprocessor or processor and a computer-readable medium, logic gates, switches, disclosure specific integrated circuits (ASICs), programmable logic controllers, and embedded microcontrollers storing computer-readable program code (such as software or firmware) executable by the (micro) processor. Examples of the controller include, but are not limited to, the following microcontrollers: ARC 625D, Atmel AT91SAM, Microchip PIC18F26K20 and Silicone Labs C8051F320. The memory controller may also be implemented as part of the control logic for the memory. A person of ordinary skill in the art also knows that, in addition to implementing the controller in pure computer-readable program codes, it is entirely possible to make the controller logic gates, switches, dedicated integrated circuits, programmable logic controllers, embedded microcontrollers and the like to achieve the same function by logically programming the method and the steps. Therefore, such a controller may be regarded as a hardware component, and apparatuses included in the controller for implementing various functions may also be regarded as structures within the hardware component. Or even, devices for implementing various functions may be regarded as both software modules implementing the method and structures within hardware component.

The system, apparatus, module, or unit described in the embodiments of the present application may be implemented by a computer chip or entity, or may be implemented by using a product with a certain function. A typical implementation device is a computer. The computer may be a personal computer, a laptop computer, a cellular phone, a camera phone, a smartphone, a personal digital assistant, a media player, a navigation device, an email device, a game console, a tablet computer, a wearable device, or any combination of these devices.

For convenience of description, when describing the above apparatus, the functions are divided into various units and described separately. Of course, when implementing the present disclosure, the functions of the units may be implemented in the same software or multiple software and/or hardware.

Those skilled in the art should understand that the examples of the present disclosure may be implemented as a method, a system, or a computer program product. Therefore, the present disclosure may take the form of an entirely hardware implementation, an entirely software implementation, or an implementation combining both software and hardware aspects. Moreover, the present disclosure may take the form of a computer program product implemented on one or more computer-usable storage media (including, but not limited to, disk memory, CD-ROM, optical memory, etc.) containing computer-usable program code.

The present disclosure is described with reference to flowcharts and/or block diagrams of methods, devices (systems), and computer program products according to implementations of the present disclosure. It should be understood that each process and/or block in the flowcharts and/or block diagrams, and combinations of processes and/or blocks in the flowcharts and/or block diagrams may be implemented by computer program instructions. These computer program instructions may be provided to a processor of a general-purpose computer, a special purpose computer, an embedded processor or other programmable data processing device to generate a machine, such that the instructions executed by the processor of a computer or other programmable data processing device produce a device for achieving the functions specified in one or more processes of a flow chart and/or in one or more boxes of a block diagram.

These computer program instructions may also be stored in computer-readable memory capable of booting a computer or other programmable data processing device to work in a particular manner, such that the instructions stored in the computer-readable memory produce manufactured products including an instruction device, the instruction device implements the function specified in one or more processes of a flow chart and/or in one or more boxes of a block diagram.

These computer program instructions may also be loaded into a computer or other programmable data processing device, such that a series of operational steps are executed on a computer or other programmable device to produce computer-implemented processing, so that the instructions executed on a computer or other programmable device provide steps for achieving the functions specified in one or more processes of a flow chart and/or in one or more boxes of a block diagram.

In a typical configuration, a computing device includes one or more processors (CPUs), an input/output interface, a network interface, and a memory.

The memory may include a transitory memory, a random-access memory (RAM), and/or a non-volatile memory in a computer-readable medium, such as a read-only memory (ROM) or a flash RAM. Memory is an example of the computer readable medium.

Computer-readable media includes permanent and non-persistent, removable and non-removable media. Information storage may be accomplished by any method or technology. The information may be computer readable instructions, data structures, modules of programs, or other data. Examples of computer storage medium include, but not limited to, a phase change memory (PRAM), a static random access memory (SRAM), a dynamic random access memory (DRAM), other types of random access memory (RAM), a read only memory (ROM), an electrically erasable programmable read only memory (EEPROM), a flash memory or other memory technologies, a compact disk read only memory (CD-ROM), a digital versatile disk (DVD) or other optical storage, a cassette tape, a disk tape storage or other magnetic storage devices or any other non-transportable medium, which may be used to store information that may be accessed by a computing device. As defined herein, computer-readable media does not include temporary computer-readable media (transitory media), such as modulated data signals and carrier waves.

It should also be noted that the terms "including", "comprising" or any other variation are intended to cover non-exclusive inclusion, so that a process, a method, a product or a device that includes a series of elements includes not only those elements, but also includes other elements that are not explicitly listed, or elements that are inherent to such process, method, product, or device. Without more restrictions, the elements defined by the sentence "including (comprising) a/an . . . " do not exclude the existence of other identical elements in the process, method, article or apparatus that include the elements.

Those skilled in the art should understand that the examples of the present disclosure may be implemented as a method, a system, or a computer program product. Therefore, the present disclosure may take the form of an entirely hardware implementation, an entirely software implementation, or an implementation combining both software and hardware aspects. Moreover, the present disclosure may take the form of a computer program product implemented on one or more computer-usable storage media (including, but not limited to, disk memory, CD-ROM, optical memory, etc.) containing computer-usable program code.

This disclosure may be described in the general context of computer-executable instructions executed by a computer, such as program modules. Generally, program modules include routines, programs, objects, components, data structures, etc. that execute specific tasks or implement specific abstract data types. The present disclosure may also be practiced in distributed computing environments in which tasks are executed by remote processing devices connected through a communication network. In a distributed computing environment, program modules may be located in local and remote computer storage media, including storage devices.

Between each embodiment in the present disclosure, the same or similar parts may be referred to each other, each embodiment focuses on the differences from other embodiments. In particular, with respect to the system implementations, since they are basically similar to the method implementations, the description thereof is relatively simple. For the related parts, reference may be made to the description of the method implementations.

The above are only implementations of the present disclosure and are not intended to limit the present disclosure. For those skilled in the art, this disclosure may have various modifications and changes. Any modification, equivalent replacement, and improvement made within the spirit and principle of this disclosure shall be included in the scope of claims of this disclosure.

What is claimed is:

1. A graph data processing system, comprising:

a memory;

a plurality of processing units, wherein each of the processing units is configured to: for obtained target graph data, according to a preset graph pattern matching algorithm, determine a plurality of set operations required to extract one or more subgraphs matching a specified graph pattern from the target graph data, wherein each of the plurality of set operations is configured to represent an operation executed on neighboring node sets of two nodes in the target graph data, and comprises at least one of taking an intersection set of two of the neighboring node sets or taking a difference set of two of the neighboring node sets; and a decision module configured in each of the plurality of processing units and configured to: for each of the plurality of set operations, according to a number of nodes contained in two node sets involved in the set operation and a preset cost function, determine cost values for executing the set operation respectively in accordance with a plurality of execution policies, and select an execution policy with a smallest cost value from the plurality of execution policies as a target policy corresponding to the set operation, wherein each of the plurality of processing units is further configured to:

for each of the plurality of set operations, execute the set operation according to a corresponding target policy, obtain an execution result corresponding to the set operation, and store the execution result in the memory; and in response to obtaining the execution result corresponding to each of the plurality of set operations, read the execution results corresponding to the plurality of set operations from the memory, and according to the execution results corresponding to the plurality of set operations, determine one or more subgraphs matching the specified graph pattern in the target graph data to execute one or more tasks according to the one or more subgraphs.

2. The graph data processing system according to claim 1, further comprising: a detection module configured in each of the plurality of processing units, wherein each detection module is configured to:

for each of the plurality of set operations, determine whether a number of times the set operation is executed exceeds a first preset threshold, and in response to determining that the number of times the set operation is executed exceeds the first preset threshold, determine that the set operation is a target set operation, and persistently store an execution result of the target set operation for reuse when the set operation needs to be executed again.

3. The graph data processing system according to claim 2, further comprising: at least one dynamic partition module, wherein each of the at least one dynamic partition module is configured to:

obtain original graph data;

for each node in the original graph data, determine whether a degree of the node exceeds a second preset threshold, in response to determining that the degree of the node exceeds the second preset threshold, determine that the node is a center node, and through multiple rounds of neighboring node traversal, determine each node that has a connection relationship with the center node as an associated node of the center node;

determine a graph data block according to the center node and associated nodes of the center node, and take the graph data block as target graph data, such that a processing unit processes the graph data block.

4. The graph data processing system according to claim 3, wherein the at least one dynamic partition module is further configured to:

for each graph data block, generate a processing task used to process the graph data block, and add the processing task to a preset task queue, wherein, for each of the plurality of processing units, the processing unit is configured to obtain a corresponding processing task from one or more task queues, and take a graph data block corresponding to the corresponding processing task as target graph data.

5. The graph data processing system according to claim 3, wherein the at least one dynamic partition module is further configured to:

for each center node, determine whether the center node is an accessed node, in response to determining that the center node is not the accessed node, through the multiple rounds of neighboring node traversal, determine the associated nodes of the center node, and set the center node as an accessed node.

6. The graph data processing system according to claim 3, wherein the memory comprises a plurality of Level 1 caches and a plurality of Level 2 caches, and wherein each of the plurality of processing units has an independent storage space comprising a Level 1 cache and a Level 2 cache, and the independent storage space is an on-chip cache packaged together with the processing unit.

7. The graph data processing system according to claim 6, wherein the memory further comprises a Last Level Cache, and wherein the Last Level Cache is shared by two or more of the plurality of processing units.

8. The graph data processing system according to claim 3, wherein each of the plurality of processing units comprises a respective processing core in a multi-core processor, and wherein the decision module and the detection module in each of the plurality of processing units comprise respective hardware units arranged on the respective processing core.

9. The graph data processing system according to claim 8, wherein the at least one dynamic partition module comprises a hardware unit arranged on the multi-core processor.

10. The graph data processing system according to claim 2, wherein the detection module is further configured to:

for each of the plurality of set operations, determine whether there is a unique identifier corresponding to the set operation, and in response to determining that there is no unique identifier corresponding to the set operation, generate and store a unique identifier corresponding to the set operation according to two sets involved in the set operation and a type of the set operation.

11. The graph data processing system according to claim 1, wherein the decision module is further configured to:

for each of the plurality of set operations, according to the number of nodes contained in the two node sets involved in the set operation and performance data of the processing unit that executes the set operation, determine computing time and memory access time required to execute the set operation in accordance with each of the plurality of execution policies, and determine a cost value corresponding to each of the plurality of execution policies according to the computing time and the memory access time, wherein the performance data of the processing unit comprises a bandwidth of the processing unit and a memory access delay of the processing unit.

12. A graph data processing method, applied to a graph data processing system comprising a memory and a plurality of processing units, a decision module being provided in each of the plurality of processing units, the method comprising:

for obtained target graph data, determining, by a processing unit of the plurality of processing units and according to a preset graph pattern matching algorithm, a plurality of set operations required to extract one or more subgraphs matching a specified graph pattern from the target graph data, wherein each of the plurality of set operations is configured to represent an operation executed on neighboring node sets of two nodes in the target graph data, and comprises at least one of taking an intersection set of two of the neighboring node sets or taking a difference set of two of the neighboring node sets; and for each of the plurality of set operations, determining, by the decision module provided in the processing unit according to a number of nodes contained in two node sets involved in the set operation and a preset cost function, cost values for executing the set operation respectively in accordance with a plurality of execution policies, and selecting an execution policy with a smallest cost value from the plurality of execution policies as a target policy corresponding to the set operation;

for each of the plurality of set operations, executing, by the processing unit according to the corresponding target policy, the set operation to obtain an execution result corresponding to the set operation and store the execution result in the memory; and in response to obtaining the execution result corresponding to each of the plurality of set operations, reading, by the processing unit, corresponding execution results of the plurality of set operations from the memory, and determining, by the processing unit according to the respective corresponding execution results of the plurality of set operations, one or more subgraphs matching the specified graph pattern in the target graph data to execute one or more tasks according to the one or more subgraphs.

13. The method according to claim 12, wherein a detection module is provided in each of the plurality of processing units, and wherein the method further comprises:

for each of the plurality of set operations, by each detection module provided in each corresponding processing unit, determining whether a number of times the set operation is executed exceeds a first preset threshold, and in response to determining that the number of times the set operation is executed exceeds the first preset threshold, determining that the set operation is a target set operation, and persistently storing an execution result of the target set operation for reuse when the set operation needs to be executed again.

14. The method according to claim 12, wherein the graph data processing system further comprises a dynamic partition module, and wherein the method further comprises:

obtaining, by the dynamic partition module, original graph data;

for each node in the original graph data, by the dynamic partition module, determining whether a degree of the node exceeds a second preset threshold, in response to determining that the degree of the node exceeds the second preset threshold, determining that the node is a center node, through multiple rounds of neighboring node traversal, determining each node that has a connection relationship with the center node as an associated node of the center node; and determining a graph data block according to the center node and associated nodes of the center node, such that a processing unit takes the graph data block as the target graph data.

15. The method according to claim 14, wherein taking the graph data block as the target graph data comprises:

obtaining a processing task from a preset task queue, and taking the graph data block corresponding to the processing task as the target graph data, wherein the processing task is generated by the dynamic partition module for each graph data block and added by the dynamic partition module to the preset task queue.

16. The method according to claim 14, wherein, through multiple rounds of neighboring node traversal, determining each node that has the connection relationship with the center node as the associated node of the center node comprises:

determining, by the dynamic partition module, whether the center node is an accessed node; and in response to determining that the center node is not the accessed node, through the multiple rounds of neighboring node traversal, by the dynamic partition module, determining the associated nodes of the center node, and setting the center node as an accessed node.

17. The method according to claim 13, wherein, before determining whether a number of times the set operation is executed exceeds the first preset threshold, the method further comprises:

determining, by the detection module provided in the processing unit, whether there is a unique identifier corresponding to the set operation, in response to determining that there is no unique identifier corresponding to the set operation, by the detection module, generating and storing a unique identifier corresponding to the set operation according to two sets involved in the set operation and a type of the set operation.

18. The method according to claim 12, wherein according to the number of the nodes contained in the two sets involved in the set operation and the preset cost function, determining the cost values for executing the set operation respectively in accordance with the plurality of execution policies comprises:

by the decision module in the processing unit, according to the number of the nodes contained in the two node sets involved in the set operation and performance data of the processing unit that executes the set operation, determining computing time and memory access time required to execute the set operation in accordance with each of the execution policies, and by the decision module, determining a cost value corresponding to each of the execution policies according to the computing time and the memory access time, wherein the performance data of the processing unit comprises a bandwidth of the processing unit and a memory access delay of the processing unit.

19. A non-transitory machine-readable storage medium storing a computer program for execution by a processor to perform the method as described in claim 12.

20. An electronic device, comprising a memory, a processor, and a computer program stored on the memory and executable by the processor to perform the method as described in claim 12.

* * * * *